United States Patent
Mizuguchi et al.

(10) Patent No.: US 9,171,071 B2
(45) Date of Patent: Oct. 27, 2015

(54) MEANING EXTRACTION SYSTEM, MEANING EXTRACTION METHOD, AND RECORDING MEDIUM

(75) Inventors: Hironori Mizuguchi, Toyko (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 523 days.

(21) Appl. No.: 13/636,061

(22) PCT Filed: Mar. 24, 2011

(86) PCT No.: PCT/JP2011/057224
§ 371 (c)(1),
(2), (4) Date: Sep. 19, 2012

(87) PCT Pub. No.: WO2011/118723
PCT Pub. Date: Sep. 29, 2011

(65) Prior Publication Data
US 2013/0006636 A1 Jan. 3, 2013

(30) Foreign Application Priority Data
Mar. 26, 2010 (JP) ................................ 2010-071857

(51) Int. Cl.
*G06F 15/18* (2006.01)
*G06F 17/30* (2006.01)

(52) U.S. Cl.
CPC .... *G06F 17/30705* (2013.01); *G06F 17/30616* (2013.01)

(58) Field of Classification Search
None
See application file for complete search history.

(56) References Cited

U.S. PATENT DOCUMENTS

2005/0261889 A1* 11/2005 Iwakura .......................... 704/4
2011/0137898 A1* 6/2011 Gordo et al. ................. 707/737
2012/0030157 A1* 2/2012 Tsuchida et al. ............... 706/20

FOREIGN PATENT DOCUMENTS

JP 2005-031785 2/2005
JP 2008-287388 11/2008

OTHER PUBLICATIONS

Ashraf et al. "Employing Clustering Techniques for Automatic Information Extraction From HTML Documents", IEEE SMC, vol. 38, No. 5, 2008, pp. 660-673.*

(Continued)

*Primary Examiner* — Li-Wu Chang
(74) *Attorney, Agent, or Firm* — Young & Thompson

(57) ABSTRACT

A meaning extraction device includes a clustering unit, an extraction rule generation unit and an extraction rule application unit. The clustering unit acquires feature vectors that transform numerical features representing the features of words having specific meanings and the surrounding words into elements, and clusters the acquired feature vectors into a plurality of clusters on the basis of the degree of similarity between feature vectors. The extraction rule generation unit performs machine learning based on the feature vectors within a cluster for each cluster, and generates extraction rules to extract words having specific meanings. The extraction rule application unit receives feature vectors generated from the words in documents which are subject to meaning extraction, specifies the optimum extraction rules for the feature vectors, and extracts the meanings of the words on the basis of which the feature vectors were generated by applying the specified extraction rules to the feature vectors.

20 Claims, 16 Drawing Sheets

(56) References Cited

OTHER PUBLICATIONS

International Search Report, PCT/JP2011/057224, Jun. 28, 2011.
Masaaki Tsuchida, Jisho to Tag Nashi Corpus o Mochiita Koyu Hyogen Chushutsuki no Gakushuho, 2009 Nendo Annual Conference of JSAI (Dai 23 Kai) Ronbunshu [CD-ROM], Jun. 19, 2009, pp. 1 to 4.
Tomoya Iwakura, "Japanese Named Entity Extraction by Augmenting Features with Unlabled Data", Transactions of Information Processing Society of Japan Ronbunshi Journal [CD-ROM], Oct. 15, 2008, vol. 49, No. 10, pp. 3657 to 3669.
Hiroyasu Yamada, "Japanese Named Entity Extraction Using Support Vector Machine", Transactions of Information Processing Society of Japan, Jan. 15, 2002, vol. 43, No. 1, p. 44 to 53.

* cited by examiner

FIG.2

TAGGED DOCUMENT (SOLUTION DATA)

| | |
|---|---|
| DOCUMENT 1 | COMPANY N RELEASED <PRODUCT NAME> WEBOO </PRODUCT NAME>. THROUGH <TECHNOLOGY NAME> WEB MANAGEMENT INTEGRATION </TECHNOLOGY NAME>, <PRODUCT NAME> WEBOO </PRODUCT NAME> CAN CUT CONVENTIONAL WEB MANAGEMENT COSTS IN HALF. ··· (COMPANY N GA <PRODUCT NAME> WEBOO </PRODUCT NAME> WO RELEASE SHIMASHITA. <TECHNOLOGY NAME> WEB MANAGEMENT INTEGRATION </TECHNOLOGY NAME> NIYORI, ZYURAINO WEB KANRI KOSUTO WO HANBUN NI DEKIMASU. ··· ) |
| DOCUMENT 2 | COMPANY N RELEASED <PRODUCT NAME> OOVOICE </PRODUCT NAME>. <PRODUCT NAME> OOVOICE </PRODUCT NAME> IS SOFTWARE FOR <TECHNOLOGY NAME> VOICE RECOGNITION </TECHNOLOGY NAME>. ··· (COMPANY N WA <PRODUCT NAME> OOVOICE </PRODUCT NAME> WO RELEASE SHIMASHITA. <PRODUCT NAME> OOVOICE </PRODUCT NAME> TOWA <TECHNOLOGY NAME> ONSEI NINSHIKI </TECHNOLOGY NAME> SURU SOFTWARE DESU. ··· ) |
| DOCUMENT 3 | COMPANY N ANNOUNCED <PRODUCT NAME> OOVOICE </PRODUCT NAME> AT ITS HEADQUARTERS. ··· (COMPANY N HA <PRODUCT NAME> OOVOICE </PRODUCT NAME> NO HAPPYOU WO HONSHA DE OKONAI MASHITA. ··· ) |
| DOCUMENT 4 | COMPANY N ANNOUNCED <PRODUCT NAME> OOVOICE </PRODUCT NAME> ··· (COMPANY N HA <PRODUCT NAME> OOVOICE </PRODUCT NAME> WO HAPPYOU ··· ) |
| DOCUMENT 5 | XX LABORATORY PREDICTS RAPID GROWTH AS A RESULT OF COMPANY N RELEASING <PRODUCT NAME> WEBOO </PRODUCT NAME> ··· (XX LABORATORYB WA <PRODUCT NAME> WEBOO </PRODUCT NAME> NO RELEASE NIYORI KYUSEICYO YOSOKU ··· ) |
| DOCUMENT 6 | COMPANY N RELEASED <PRODUCT NAME> WEBOO </PRODUCT NAME> AND SALES ARE STRONG. ··· (COMPANY N GA <PRODUCT NAME> WEBOO </PRODUCT NAME> WO RELEASE SHI, URIAGE KOCYO. ··· ) |
| DOCUMENT 7 | COMPANY N HAS BEGUN SALES OF <PRODUCT NAME> NOTEOO </PRODUCT NAME>. ··· (COMPANY N GA <PRODUCT NAME> NOTEOO </PRODUCT NAME> NO HANBAI WO KAISHI.···) |
| DOCUMENT 8 | COMPANY N ANNOUNCED SECOND-HALF RESULTS. ··· (COMPANY N GA SECOND-HALF RESULTS WO HAPPYOU. ··· ) |

FIG.3

EXAMPLE OF FEATURE VECTORS (DOCUMENT 1, SENTENCE 1, COMPANY N, UNKNOWN)
= (IN-WORD_"COMPANY N": 1, IN-WORD_NOUN: 1, CONTEXT_"GA": 1, CONTEXT_PARTICLE: 1, CONTEXT_WEBOO: 1, CONTEXT_NOUN: 1)

(DOCUMENT 1, SENTENCE 1, WEBOO, PRODUCT NAME)
= (IN-WORD_"WEBOO": 1, IN-WORD_NOUN: 1, CONTEXT _COMPANY N: 1, CONTEXT_"GA": 1, CONTEXT_"WO": 1, CONTEXT_RELEASE: 1, CONTEXT_NOUN: 2, CONTEXT_PARTICLE: 2)

(DOCUMENT 1, SENTENCE 1, RELEASE, UNKNOWN)
= (IN-WORD_"RELEASE": 1, IN-WORD_NOUN: 1, CONTEXT_"WEBOO": 1, CONTEXT_NOUN: 1, CONTEXT_"WO": 1, CONTEXT: PARTICLE: 1, CONTEXT_"SURU": 1, CONTEXT_VERB: 1)

FIG.4

| CLUSTER NAME | FEATURE VECTOR GROUP | DATA NUMBER |
|---|---|---|
| CLUSTER 1 | (DOCUMENT 2, SENTENCE 1, COMPANY N, UNKNOWN)<br>(DOCUMENT 3, SENTENCE 1, COMPANY N, UNKNOWN)<br>(DOCUMENT 4, SENTENCE 1, COMPANY N, UNKNOWN)<br>... | 200 |
| CLUSTER 2 | (DOCUMENT 1, SENTENCE 1, COMPANY N, UNKNOWN)<br>(DOCUMENT 5, SENTENCE 1, COMPANY N, UNKNOWN)<br>(DOCUMENT 6, SENTENCE 1, COMPANY N, UNKNOWN)<br>(DOCUMENT 8, SENTENCE 1, COMPANY N, UNKNOWN)<br>... | 100 |
| CLUSTER 3 | (DOCUMENT 1, SENTENCE 1, WEBOO, PRODUCT NAME)<br>(DOCUMENT 5, SENTENCE 1, WEBOO, PRODUCT NAME)<br>(DOCUMENT 6, SENTENCE 1, WEBOO, PRODUCT NAME)<br>... | 50 |
| CLUSTER 4 | (DOCUMENT 2, SENTENCE 1, OOVOICE, PRODUCT NAME)<br>(DOCUMENT 3, SENTENCE 1, OOVOICE, PRODUCT NAME)<br>(DOCUMENT 4, SENTENCE 1, OOVOICE, PRODUCT NAME)<br>(DOCUMENT 8, SENTENCE 1, OOVOICE, PRODUCT NAME)<br>... | 30 |
| CLUSTER 5 | (DOCUMENT 7, SENTENCE 1, NOTEOO, PRODUCT NAME)<br>... | 4 |

TOTAL DATA NUMBER : 384
AVERAGE DATA NUMBER : 76.8

FIG.6

| CONDITIONS | | PROCESS |
|---|---|---|
| DATA SIMILARITY DISPERSION | DATA AMOUNT DISPERSION | |
| LOW | HIGH (LARGE DATA AMOUNT) | FEATURE VECTORS CLOSE TO CLUSTER CENTER DELETED OR MOVED |
| LOW | HIGH (SMALL DATA AMOUNT) | FEATURE VECTORS OF OTHER CLUSTER SEPARATED AT LEAST A PRESCRIBED DISTANCE FROM ANY FEATURE VECTOR IN THE CLUSTER AND CLOSEST TO THE CENTER OF THIS CLUSTER ADDED |
| HIGH | HIGH (LARGE DATA AMOUNT) | FEATURE VECTOR DELETED OR MOVED |
| HIGH | HIGH (SMALL DATA AMOUNT) | FEATURE VECTOR ADDED |

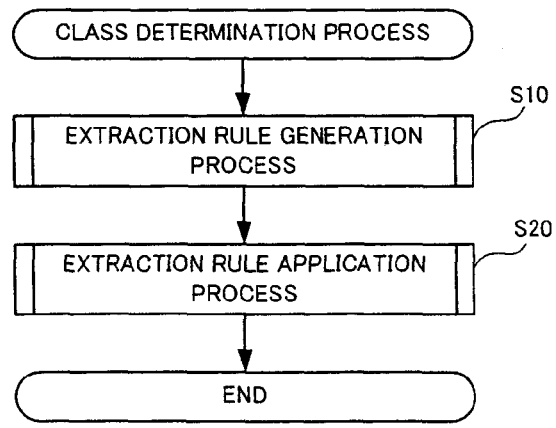

FEATURE VECTORS IN CLUSTER

```
FEATURE VECTOR (DOCUMENT 1, SENTENCE 1, COMPANY N, UNKNOWN)
= (IN-WORD_"COMPANY N": 1, IN-WORD_NOUN: 1, CONTEXT_"GA": 1, CONTEXT_PARTICLE: 1,
CONTEXT_WEBOO: 1, CONTEXT_NOUN: 1)

FEATURE VECTOR (DOCUMENT 5, SENTENCE 1, COMPANY N, UNKNOWN)
= (IN-WORD_"COMPANY N": 1, IN-WORD_NOUN: 1, CONTEXT_XX LABORATORY: 1,
CONTEXT_"WA":1, CONTEXT_"GA": 1, CONTEXT_PARTICLE: 2, CONTEXT_WEBOO: 1,
CONTEXT_NOUN: 2)

FEATURE VECTOR (DOCUMENT 6, SENTENCE 1, COMPANY N, UNKNOWN)
= (IN-WORD_"COMPANY N": 1, IN-WORD_NOUN: 1, CONTEXT_"GA": 1, CONTEXT_PARTICLE: 1,
CONTEXT_WEBOO: 1, CONTEXT_NOUN: 1)

FEATURE VECTOR (DOCUMENT 8, SENTENCE 1, COMPANY N, UNKNOWN)
= (IN-WORD_"COMPANY N": 1, IN-WORD_NOUN: 1, CONTEXT_SECOND HALF RERESULTS: 1,
CONTEXT_"WA":1, CONTEXT_"GA": 1, CONTEXT_PARTICLE: 2, CONTEXT_WEBOO: 1,
CONTEXT_NOUN: 2)
```

FIG.14B

FEATURE VECTORS IN CLUSTER

```
FEATURE VECTOR (DOCUMENT 1, SENTENCE 1, COMPANY N, UNKNOWN)
= (IN-WORD_"COMPANY N": 1, IN-WORD_NOUN: 1, CONTEXT_"GA": 1, CONTEXT_PARTICLE: 0.5,
CONTEXT_WEBOO: 1, CONTEXT_NOUN: 0.5)

FEATURE VECTOR (DOCUMENT 5, SENTENCE 1, COMPANY N, UNKNOWN)
= (IN-WORD_"COMPANY N": 1, IN-WORD_NOUN: 1, CONTEXT_XX LABORATORY: 1,
CONTEXT_"WA":1, CONTEXT_"GA": 1, CONTEXT_PARTICLE: 1, CONTEXT_WEBOO: 1,
CONTEXT_NOUN: 1)

FEATURE VECTOR (DOCUMENT 6, SENTENCE 1, COMPANY N, UNKNOWN)
= (IN-WORD_"COMPANY N": 1, IN-WORD_NOUN: 1, CONTEXT_"GA": 1, CONTEXT_PARTICLE: 0.5,
CONTEXT_WEBOO: 1, CONTEXT_NOUN: 0.5)

FEATURE VECTOR (DOCUMENT 8, SENTENCE 1, COMPANY N, UNKNOWN)
= (IN-WORD_"COMPANY N": 1, IN-WORD_NOUN: 1, CONTEXT_SECOND HALF RESULTS: 1,
CONTEXT_"WA":1, CONTEXT_"GA": 1, CONTEXT_PARTICLE: 1, CONTEXT_WEBOO: 1,
CONTEXT_NOUN: 1)
```

FIG.15

| FEATURE | VALUE (FREQUENCY) |
|---|---|
| IN-WORD_COMPANY N | 4 |
| IN-WORD_NOUN | 4 |
| CONTEXT_"GA" | 4 |
| CONTEXT_PARTICLE | 6 |
| CONTEXT_WEB00 | 4 |
| CONTEXT_NOUN | 6 |
| CONTEXT_XX LABORATORY | 1 |
| CONTEXT_"WA" | 2 |
| CONTEXT_SECOND HALF RESULTS | 1 |

MEANING EXTRACTION SYSTEM, MEANING EXTRACTION METHOD, AND RECORDING MEDIUM

TECHNICAL FIELD

The present invention relates to a meaning extraction system, a meaning extraction method and a recording medium.

BACKGROUND ART

Text in newspaper articles, on Web pages and/or the like contains large numbers of characteristic expressions having a meaning (hereinafter also called a "class") such as people's names, place names, organization names and/or the like. By recognizing these characteristic expressions from within the text, it is possible to effectively utilize text data in question answering systems, document classification, machine translation and/or the like.

An example of extracting characteristic expressions from text is disclosed in Non-Patent Literature 1. The method disclosed in Non-Patent Literature 1 creates in advance text data having an annotation (tag) appended as solution data to the classes of characteristic expression to be extracted. Furthermore, the method disclosed in Non-Patent Literature 1 accomplishes machine learning using an SVM (Support Vector Machine) from the solution data created in advance and generates rules for extracting the characteristic expressions. By using the generated extraction rules, it is possible to extract a class of characteristic expressions from arbitrary text.

If a class of phrases is the same, the art disclosed in Non-Patent Literature 1 generates extraction rules for each class by accomplishing machine learning on the premise that text information surrounding those phrases will be similar. The surroundings of a phrase includes words in text having a prescribed relationship with that phrase, such as words positioned before or after that phrase, and also includes words showing the type of text. The text information is information showing the character string, part of speech, connection and/or the like.

PRIOR ART LITERATURE

Non-Patent Literature

Non-Patent Literature 1: Hiroyasu Yamada, Taku Kudo, Yuji Matsumoto, "Japanese Named Entity Extraction Using Support Vector Machine," IPSJ Journal, Vol. 43, No. 1 pp.

DISCLOSURE OF INVENTION

Problems to be Solved by the Invention

However, because there are various ways of writing text, even phrases having the same meaning do not necessarily having similar text information in surrounding words. For example, if "VoiceXX" is a phrase whose class is "product name," writing methods for this include "Company N released VoiceXX", "Voice XX is voice recognition software," and/or the like.

With the art in the above-described Non-Patent Literature 1, not only are there a variety of ways of writing text used in the solution data, extraction rules with scarce generalization capacity are generated when there is deviation in the way of writing, and as a result the problem arises that the accuracy of extracting characteristic expressions deteriorates. The generalization capacity is the capacity to extract a class of characteristic expression correctly even with respect to unknown phrases other than the phrases in the solution data provided at the time of machine learning.

In consideration of the foregoing, it is an object of the present invention to provide a meaning extraction system, a meaning extraction method and a recording medium that can extract phrases having a specified meaning from text with high accuracy.

Means for Solving the Problems

In order to achieve the above object, the meaning extraction system of the present invention comprises:
a clustering means for acquiring feature vectors generated for each word appearing in solution data in which annotations are appended to words having specific meanings to identify that meaning, and having as factors feature values indicating the features of those words and surrounding words, and clustering the acquired feature vectors into multiple clusters based on the similarity between feature vectors;
a cluster updating means for determining whether or not each of the feature vectors clustered by the clustering means has a deviation in the clusters, and when it is determined that there is a cluster having a deviation, updating the feature vectors clustered in each cluster so as to improve the deviation;
an extraction rule generating means for accomplishing machine learning based on the feature vectors in a cluster for each cluster and generating extraction rules for extracting words having a specific meaning; and
an extraction rule application means for receiving a feature vector created from words in a document that is a target of meaning extracting, specifying the optimum extraction rule for this feature vector and extracting the meaning of words that were the source of creating the feature vector by applying the specified extraction rule to the feature vector.

Efficacy of the Invention

With the present invention, extraction rules that can be applied to meaning extraction are generated for each class with improved deviation of the clustered feature vectors. Consequently, even when the way of writing the text indicating the solution data deviates, when extracting meaning it is possible to reduce the effects of the way of writing the text. Accordingly, it is possible to generate extraction rules having high generalization capacity, making it possible to realize meaning extraction with high accuracy.

BRIEF DESCRIPTION OF DRAWINGS

FIG. 2 is a drawing showing an example of solution data;

FIG. 3 is a drawing showing an example of a feature vector;

FIG. 4 is a drawing showing the results of clustering;

FIG. 6 is a drawing showing the relationship between process contents and conditions of a cluster update process accomplished by a cluster update unit;

FIG. 7 is a flowchart for explaining the flow of a process determining classes;

FIG. 14A is a drawing showing an example prior to the feature vector being converted;

FIG. 14B is a drawing showing an example after the feature vector is converted;

FIG. 15 is a drawing showing the relationship between the feature and the frequency thereof;

MODE FOR CARRYING OUT THE INVENTION

Figure 1:
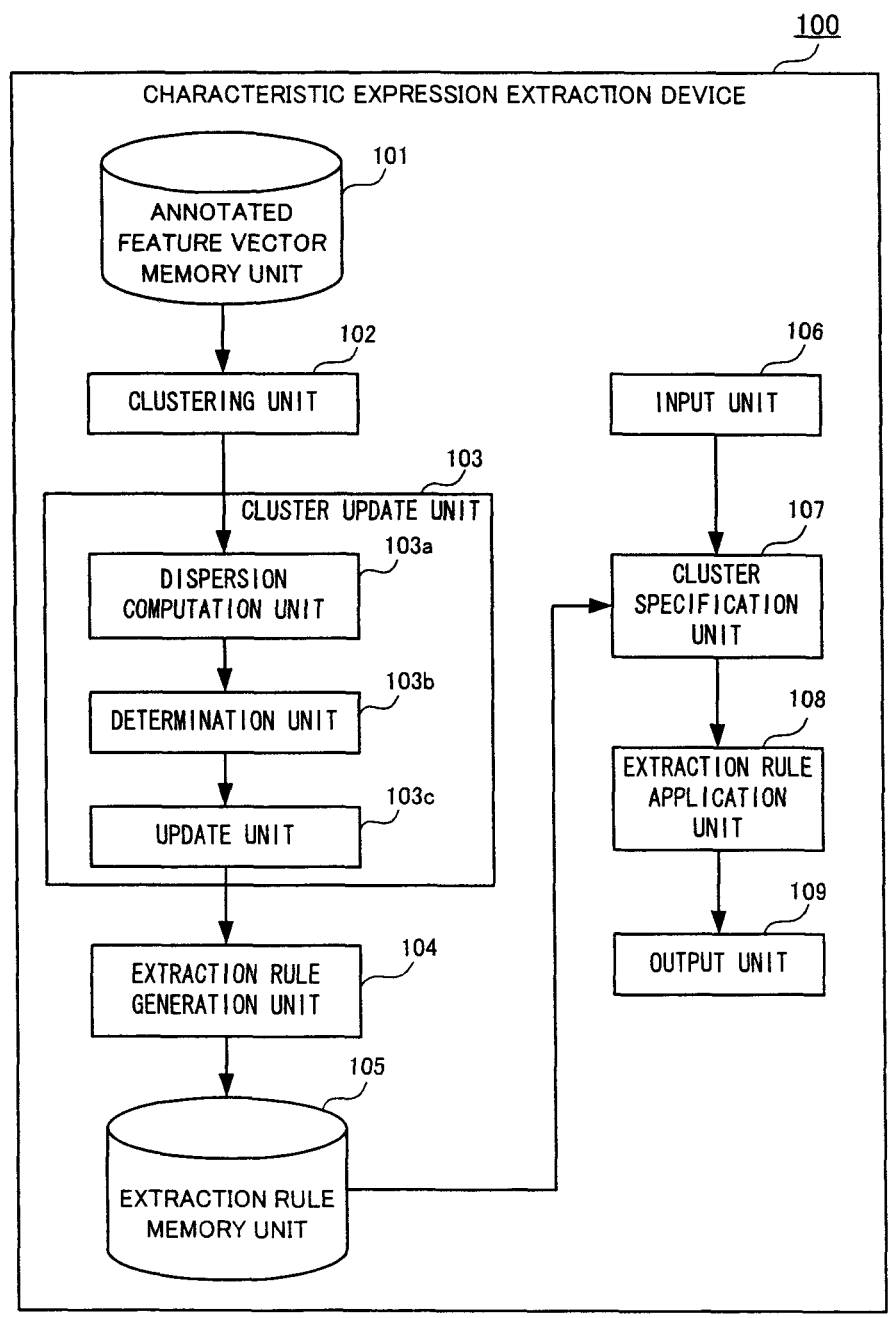
FIG. 1 is a drawing showing the composition of a characteristic expression extraction device according to a first preferred embodiment of the present invention.

Below, the preferred embodiments of the present invention are explained in detail with reference to the drawings. The present invention is not limited by the below preferred embodiments and drawings. Naturally, changes may be made to the below preferred embodiments and drawings without altering the essentials of the present invention. In addition, same or corresponding parts in the drawings are labeled with the same reference numbers.

First Preferred Embodiment

A characteristic expression extraction device 100 according to a first preferred embodiment of the present invention will be explained. As shown in FIG. 1, the characteristic expression extraction device 100 has an annotated feature vector memory unit 101, a clustering unit 102, a cluster update unit 103, an extraction rule generation unit 104, an extraction rule memory unit 105, an input unit 106, a cluster specification unit 107, an extraction rule application unit 108 and an output unit 109.

The annotated feature vector memory unit 101 stores in advance data (information) indicating feature vectors generated for each word (appearing words) appearing in the annotated text data (solution data) that is a sample. The annotated text data is data that is a sample for generating extraction rules that are rules for extracting characteristic expressions, and is text data to which an annotation (tag) is attached. The annotated text data is typically prepared by a user and/or the like. The feature vectors are vectors whose components are features representing appearing words and the background (features) of surrounding words.

The annotated feature vector memory unit 101 may possess data that can generate feature vectors in place of feature vectors. One example of data that can generate feature vectors is solution data. In this case, the characteristic expression extraction device 100 has a feature vector generation unit (unrepresented) that acquires data the annotated feature vector memory unit 101 possesses and generates feature vectors based on that data.

FIG. 2 is a drawing showing an example of annotated text data (solution data). In this example, eight items of solution data for Documents 1 to 8 are illustrated. In the solution data, the location of the characteristic expression has an annotation (tag) of that class name appended. For example, in Document 1, three characteristic expressions are included, and a breakdown of those is that two are a product name "WebOO" and one is a technology name "Web management integration."

FIG. 3 is a drawing showing a portion of feature vectors extracted from Document 1 in FIG. 2. In this drawing, an example of three feature vectors, namely (Document 1, Sentence 1, Company N, Unknown), (Document 1, Sentence 1, WebOO, Product name) and (Document 1, Sentence 1, Release, Unknown), is illustrated. In this preferred embodiment, the feature vector is represented by (document number, sentence number, surface character string, class name). The sentence number is a number for specifying sentences within a document, with the sentences numbered in order from the lead sentence in the document.

For example, the feature vector (Document 1, Sentence 1, Company N, Unknown) is a word contained in sentence 1 (that is to say, the lead sentence) of document 1, and indicates that this is a feature vector relating to a word whose surface character string is "Company N". In addition, the class name "unknown" indicates that this is a word with no annotation attached.

In this preferred embodiment, the feature vector represents a feature relating to the appearing word itself and two words each (morphemes) before and after the appearing word in the document in which the feature vector was created. Each component of the feature vector is expressed as "feature name: feature value".

The feature name indicates the classification of the text information (surface character string, part of speech, and/or the like). In addition, the feature name indicates that this is a feature relating to which word this feature relates, out of the appearing word itself and the two words each before and after this appearing word. The feature value is the frequency (appearing frequency) with which text information in the classification represented by the feature name appears in that document.

In addition, in this preferred embodiment, the prefix "in-word_" attached to the feature name indicates a feature relating to the appearing word itself that is the subject of creation by that feature vector. In addition, the prefix "context_" attached to the feature name indicates a feature relating to the morphemes before and after the appearing word.

For example, "in-word_'Company N': 1" which is one element of the feature vector, is a feature of the appearing word itself relating to the text information with surface character string "Company N," and represents that there is one appearing word whose surface character string is "Company N" in the document.

In addition, the factor "in-word_noun: 1" is a feature of the appearing word itself relating to text information whose part of speech is "noun" and represents that there is one appearing word whose part of speech is noun in the document The factor "context_'ga': 1" of the feature vector is a feature of the words surrounding the appearing word relating to text information whose surface character string is "ga", and represents that there is one surrounding word in the document whose surface character string is "ga."

In addition, the factor "context_particle: 1" is a feature of the words surrounding the appearing word relating to text information whose part of speech is "particle," and represents that there is one surrounding word in the document whose part of speech is "particle."

This are just one example. For example, the feature vector may be created for the appearance of words other than nouns. In addition, the feature vector may include text information relating to specific featured words in the document and/or classification information appended to the document, as information relating to the surrounding words. In addition, the text information may include linking information and/or the like.

Returning to FIG. 1, the clustering unit 102 clusters the various feature vectors stored in the annotated feature vector memory unit 101, using a method such as an agglomeration method, a K-MEANS method and/or the like.

For example, consider a case of clustering using an agglomeration method. In this case, first the clustering unit 102 forms a cluster set $C=\{C1, C2, \ldots, Cn\}$ with the various feature vectors as clusters of individual factors. Here, C1 to Cn are each clusters whose factors are individual feature vectors.

Next, the clustering unit 102 finds the similarity among clusters in the cluster set C. For example, a shortest distance method or a longest distance method can be used to find the similarity. When a shortest distance method is used, the similarity of a vector pair is determined by the similarity between feature vectors having the highest similarity out of feature vectors pairs in each cluster comprising the pairs. When a longest distance method is used, the similarity of a cluster pair is determined by the similarity between feature vectors having the lowest similarity among feature vector pairs in each cluster comprising the pairs.

Cosine similarity and/or the like may be used for similarity between feature vectors. Cosine similarity is an indicator in which the angle formed between feature vectors is the similarity. For example, in the example of FIG. 2, the similarity between the feature vectors (Document 1, Sentence 1, Company N, unknown) and (Document 2, Sentence 1, Company N, unknown) is high because the features of the words and the surrounding text information are similar. In addition, the similarity between the feature vectors (Document 1, Sentence 1, WebOO, product name) and (Document 7, Sentence 1, NoteOO, product name) is low because the features of the words and the surrounding text information all differ.

Next, the clustering unit 102 specifies the cluster pair Ci and Cj for which the similarity between clusters is highest, and a new cluster Cnew joining this cluster pair Ci and Cj is added to the cluster set C and the clusters Ci and Cj are deleted. Furthermore, the joining of pairs of similar clusters is repeated and feature vectors are clustered until the number of clusters in the cluster set C is the same as a value set in the system beforehand.

The cluster update unit 103 determines the absence or presence of clusters with deviation in data out of the clusters clustered by the clustering unit 102. Furthermore, when there is deviation, the cluster updating unit 103 accomplishes movement to other clusters of the feature vectors or deletion until this deviation is improved.

Specifically, first the cluster update unit 103 is provided with a dispersion computation unit 103a, and this dispersion computation unit 103a computes the intra-cluster dispersion and inter-cluster dispersion.

The intra-cluster dispersion is a value indicating the degree of scattering (degree of dispersion) of the feature vectors in each cluster. The intra-cluster dispersion of this preferred embodiment is a data similarity dispersion computed based on the dissimilarity between a feature vector in each cluster and a feature vector at the center of each cluster, as described below.

The inter-cluster dispersion is a value indicating the degree of scattering (degree of dispersion) of feature vectors to each cluster. The inter-cluster dispersion of this preferred embodiment is the data amount dispersion computed based on the difference between the number of feature vectors in each cluster and the average value over all clusters of the number of feature vectors in each cluster, as described below.

The data similarity dispersion is an indicator showing the extent to which feature vectors in the clusters are scattered from the center of the cluster, and represents the deviation of data in the cluster. The higher the data similarity dispersion, the more the feature vectors in this cluster are scattered to far distances from the center of the cluster.

The data amount dispersion is an indicator showing the extent to which the number of feature vectors in the cluster differs in comparison to the average number over all clusters, and represents the deviation of data in the cluster. The higher the data amount dispersion, the more the data number in this cluster is separated from the average data number over all clusters (in other words, is greater or less than the average data number over all clusters).

A data similarity dispersion computation method will be described in detail here. The data similarity dispersion is expressed by the following equation:

$$\text{Data similarity dispersion}(C) = 1/n \times \Sigma\{\text{dissimilarity}(co, ci)\}^2$$

Here, C represents the cluster for which data similarity dispersion is being computed; n represents the number of feature vectors in the cluster C; co represents the feature vector at the center of the cluster C; and ci represents the ith feature vector in the cluster C.

The center feature vector is for example the feature vector for which the sum of similarities to all feature vectors in the cluster (for example, cosine similarity) is a maximum. Or, the center feature vector may for example be the feature vector at the position closest to the centroid of the cluster found from the various feature vectors in the cluster.

The dissimilarity (co,ci) expresses the dissimilarity between the feature vector co and the feature vector ci. The dissimilarity is a small value when the feature vectors are similar to each other and becomes a large value when these are not similar. In addition, Σ represents the computation of a sum of all feature vectors in the cluster C.

This equation is but one example, and the data similarity dispersion may, for example, be the average of dissimilarities between the feature vectors in the cluster and the center feature vector.

In addition, the data amount dispersion can be expressed by the following equation:

$$\text{Data amount dispersion}(C) = |u - n|/N$$

Here, C represents the cluster for which data amount dispersion is being computed; u represents the average of the number of feature vectors in each cluster; n represents the number of feature vectors in the cluster C; and N represents the number of feature vectors in all clusters.

This equation is but one example, and for example it would be fine to use $(u-n)^2/N$ and/or the like as the data amount dispersion.

Next, the data similarity dispersion and data amount dispersion will be described with reference to concrete examples. For example, consider the case in which five clusters are generated as shown in FIG. 4. The number of all data items (number of al feature vectors) is 384, and the average of the number of data items of the clusters is 76.8.

In this case, the data similarity dispersion of cluster 2 is computed as follows. Suppose the feature vector at the center of cluster 2 is (Document 1, Sentence 1, Company N, unknown).

Data similarity dispersion(cluster2)=$\frac{1}{100}\times$
Σ{dissimilarity((Document1,Sentence1,CompanyN,unknown),$ci$)}^2

=$\frac{1}{100}\times${dissimilarity((Document1,Sentence1,CompanyN,unknown),(Document1,Sentence1,CompanyN,unknown))

+dissimilarity((Document1,Sentence1,CompanyN,unknown),(Document5,Sentence1,CompanyN,unknown))

+dissimilarity((Document1,Sentence1,CompanyN,unknown),(Document6,Sentence1,CompanyN,unknown))

+dissimilarity((Document1,Sentence1,CompanyN,unknown),(Document8,Sentence1,CompanyN,unknown))

+ ... }

Here, the dissimilarity is defined as the value found by subtracting the cosine similarity from 1, and the dissimilarity in the above equation is computed as follows.

Dissimilarity((Document1,Sentence1,CompanyN,unknown),(Document1,Sentence1,CompanyN,unknown))=1−cosine similarity((Document1,Sentence1,CompanyN,unknown),(Document1,Sentence1,CompanyN,unknown))

=1−inner product((Document1,Sentence1,CompanyN,unknown),(Document1,Sentence1,CompanyN,unknown))/(Document1,Sentence1,CompanyN,unknown)|×|(Document1,Sentence1,CompanyN,unknown)

=0

Dissimilarity((Document1,Sentence1,CompanyN,unknown),(Document6,Sentence1,CompanyN,unknown))=0

Dissimilarity((Document1,Sentence1,CompanyN,unknown),(Document5,Sentence1,CompanyN,unknown))=1−inner product((Document1,Sentence1,CompanyN,unknown),(Document5,Sentence1,CompanyN,unknown))/|(Document1,Sentence1,CompanyN,unknown)|×|(Document5,Sentence1,CompanyN,unknown)

=1−6/($\sqrt{6}\times\sqrt{10}$)=1−0.775=0.225

Dissimilarity((Document1,Sentence1,CompanyN,unknown),(Document8,Sentence1,CompanyN,unknown))=1−6/($\sqrt{6}\times\sqrt{10}$)=1−0.775=0.225

In this manner, the more the surrounding text information (surface character strings, parts of speech) are similar, the smaller the value of the dissimilarity.

Assuming the dissimilarity of the other 96 feature vectors of cluster 2 other than those shown in the above equations to also be 0.225, the data similarity dispersion of cluster 2 can be computed as follows:

Data similarity dispersion (cluster 2) =

$$1/100 \times \sum \{\text{dissimilarity}(\text{Document 1, Sentence 1, Company } N, \text{unknown}), ci\}^2 =$$

$$1/100 \times \{0 + 0 + 0.225^2 + 0.225^2 + 0.225^2 \times 96\} = 0.049$$

In this manner, a cluster composed of feature vectors sets having small dissimilarity has a data similarity dispersion with a small value. That is to say, a cluster in which only similar surrounding text information is gathered has a data similarity dispersion with a small value.

In addition, if the cluster is composed to include feature vectors with large dissimilarities, for example, when 50 vectors having relatively large dissimilarities of 0.5 (around half with the same data) are intermixed in place of feature vectors having a dissimilarity of 0.225 in the above-described cluster 2, the data similarity dispersion is computed as follows:

Data similarity dispersion(cluster2)=$\frac{1}{100}\times(0.225^2\times 48+0.5^2\times 50)$=0.149

Accordingly, in the case of a cluster in which feature vectors with large dissimilarities are intermixed, the data similarity dispersion becomes a large value. That is to say, a cluster in which not only is the surrounding text information similar but is also dispersed to a certain degree, the data similarity dispersion becomes a large value.

In addition, the data amount similarities of cluster 1 and cluster 2 shown in FIG. 4 can be computed as follows:

Data amount similarity(cluster1)=|average data amount−cluster1 data amount|/number of all data items

=|76.8−200|/384=0.32

Data amount similarity(cluster2)=|average data amount−cluster2 data amount|/number of all data items

=|76.8−100|/384=0.06

In this manner, the data amount dispersion of cluster 1, which has large deviation (gap from average data amount) between clusters in the number of clustered feature vectors is larger than the data amount dispersion of cluster 2.

Next, the cluster update unit 103 is provided with a determination unit 103b for determining whether or not this is a cluster with deviation in data by comparing the computed data similarity dispersion and a first threshold value and in addition comparing the data amount dispersion and a second threshold value. The determination unit 103b may determine that data deviation does not exist for example when the data similarity dispersion of all clusters is more than 0.125 (first threshold value) and also the average data amount dispersion of all clusters is not greater than 0.1 (second threshold value).

The cluster update unit 103 may compare the data similarity dispersion of each cluster and the first threshold value and may determine that there is data deviation when, as a result of this comparison, similarity dispersions are contained that are less than the first threshold value. In addition, the cluster update unit 103 may compare the average of the data amount dispersions of all clusters and the second threshold value and may determine that there is data deviation when this average is larger than the second threshold value.

Figure 5A:
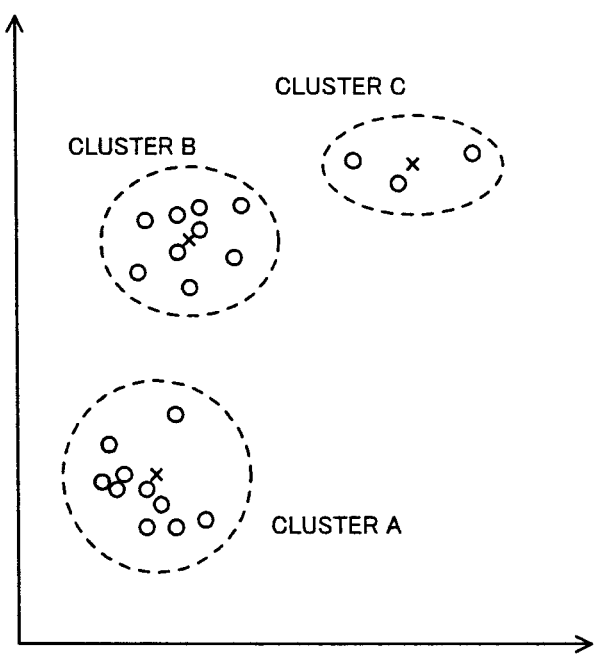
FIG. 5A is an overview showing an example of the distribution of the clustered feature vectors before updating.
Figure 5B:
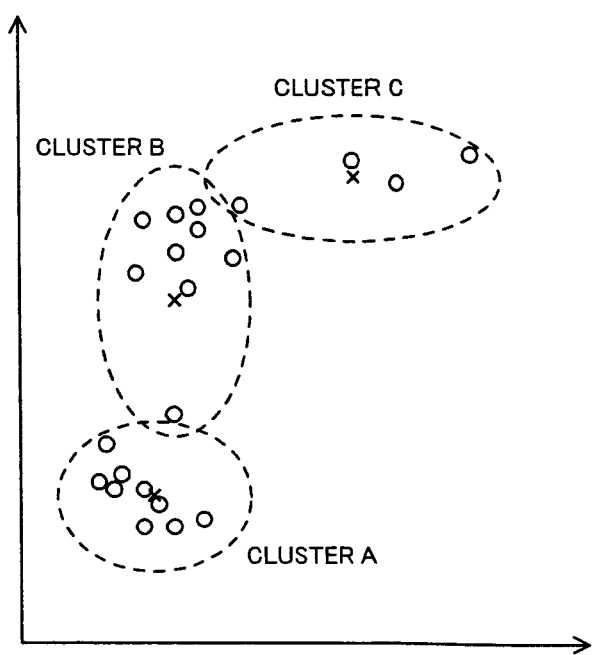
FIG. 5B is an overview showing an example of the distribution of the clustered feature vectors after updating.

FIGS. 5A and 5B are overviews showing examples before updating and after updating of the scattering of clustered feature vectors. In these drawings, O represents one feature vector. In addition, areas surrounded by dotted lines represent clusters, and the O's inside a dotted-line region represent feature vectors contained in that cluster. In these drawings, three clusters are formed, namely clusters a to c. In addition, the center of each cluster is represented by an "x".

For example, consider the case where the feature vectors have been clustered as shown in FIG. 5A. In this case, the data in each cluster is concentrated near the center, so the data similarity dispersion is low. Accordingly, when extraction rules are created from each cluster in this state, rules with poor generalization capacity result, being able to extract only words that are exactly the same as words in the solution data.

In addition, because the number of data items in cluster c is extremely small compared to that of the other clusters a and b, the data amount dispersion of cluster c is high and deviation can be seen in the number of data items between each cluster. Accordingly, when extraction rules are created from each cluster in this state, extraction rules are created in which accuracy differs for each cluster.

Accordingly, the determination unit 103b of the cluster update unit 103 determines that there is cluster deviation in FIG. 5A.

The cluster update unit 103 is further provided with an update unit 103c that updates the feature vectors clustered in each cluster so as to improve deviation when it is determined by the determination unit 103b that there is deviation. The update unit 103c of this preferred embodiment accomplishes moving, deletion and/or the like of feature vectors in the clusters so as to raise the data similarity dispersion and lower the data amount dispersion, and through this improves the data deviation.

Specifically, for clusters with a high data amount dispersion because of a large data amount, the update unit 103c of the cluster update unit 103 deletes feature vectors in that cluster or moves such to other clusters. In addition, for clusters with a high data amount dispersion because the data amount is low, the update unit 103c of the cluster update unit 103 adds feature vectors of other clusters to that cluster.

Furthermore, when deleting feature vectors in a cluster with low data similarity dispersion, the update unit 103c of the cluster update unit 103 deletes feature vectors near the center of that cluster. In addition, when adding feature vectors to a cluster with low data similarity dispersion, the update unit 103c of the cluster update unit 103 adds feature vectors that are outside the scope of that cluster and that are the closest to the center of that cluster.

Accordingly, the update unit 103c of the cluster update unit 103 accomplishes processes on a cluster under the conditions such as those shown in FIG. 6.

That is to say, in the case of a cluster with a low data similarity dispersion and a high data amount dispersion because of a large data amount, the update unit 103c of the cluster update unit 103 deletes feature vectors in this cluster or moves such to other clusters. At this time, feature vectors that are the target of moving or deletion are preferably feature vectors near the center of this cluster. The reason for accomplishing such a process is that the feature vectors in this cluster are the same as those near the center, and hence the data amount is large compared to other clusters.

In addition, in the case of a cluster with a low data similarity dispersion and a high data amount dispersion because of a small data amount, the update unit 103c of the cluster update unit 103 adds feature vectors of other clusters to this cluster. At this time, feature vectors that are the target of moving or deletion are preferably feature vectors separated by more than a prescribed distance from any feature vector in this cluster and are the closest to the center of this cluster. The reason for accomplishing such a process is that the feature vectors in this cluster are the same as those near the center, and hence the data amount is small compared to other clusters.

In addition, in the case of a cluster with a high data similarity dispersion and a high data amount dispersion because of a large data amount, the update unit 103c of the cluster update unit 103 deletes feature vectors in this cluster or moves such to other clusters. The reason for accomplishing such a process is that the data amount in this cluster is large compared to other clusters.

In addition, in the case of a cluster with a high data similarity dispersion and a low data amount dispersion because of a small data amount, the update unit 103c of the cluster update unit 103 adds feature vectors to this cluster. The reason for accomplishing such a process is that the data amount in this cluster is small compared to other clusters.

By accomplishing this kind of cluster update process, the cluster update unit 103 can improve the data deviation in a cluster by raising the data similarity dispersion to at least a threshold value or lowering the data amount dispersion to no greater than a threshold value.

For example, data clustered as shown in the above-described FIG. 5A becomes in a state such as that shown in FIG. 5B as a result of the cluster update process.

With FIG. 5B, the scope (the scope encompassed by dotted lines in the figure) covered by each cluster becomes larger compared to FIG. 5A, and the data similarity diversion becomes larger. Accordingly, it is possible to create extraction rules with higher generalization capacity from each cluster. In addition, compared to FIG. 5A, the data amount in each cluster becomes uniform and the data amount dispersion becomes lower. Accordingly, it is possible to prevent the accuracy of extraction rules created in each cluster from differing greatly.

Next, a cluster update process executed by the update unit 103c of the cluster update unit 103 will be specifically explained taking as an example the case of clusters being created as shown in FIG. 4.

First, the update unit 103c of the cluster update unit 103 detects movement source cluster groups that are candidates for moving or deletion. For example, the update unit 103c may detect, as movement source clusters, clusters having a lower data similarity dispersion than other clusters and a higher data amount dispersion than other clusters because of a large data amount. In the example of FIG. 4, cluster 1 and cluster 2 are detected as movement source cluster groups.

Next, the update unit 103c of the cluster update unit 103 detects movement destination cluster groups that are candidates for movement destination. For example, the update unit 103c may detect, as movement destination clusters, clusters having a lower data similarity dispersion than other clusters and a higher data amount dispersion than other clusters because of a small data amount. In the example of FIG. 4, cluster 4 and cluster 5 are detected as movement destination cluster groups.

Next, the update unit 103c of the cluster update unit 103 specifies the pair of clusters with the highest dispersion (movement source cluster and movement destination cluster) among the detected movement source cluster groups and movement destination cluster groups. This is in order to cause feature vectors to be moved between similar clusters. In the example in FIG. 4, cluster 1 and cluster 4 have the highest dispersion because the surrounding text information is similar. Accordingly, cluster 1 is selected as the movement source cluster and cluster 4 is selected as the movement destination cluster.

Next, the update unit 103c of the cluster update unit 103 selects one feature vector whose distance from the center of the movement destination cluster is within a prescribed value, out of the feature vectors in the movement source cluster, and causes this to move to the movement destination cluster. In addition, when there is no feature vector within the prescribed value, the update unit 103c deletes one of the feature vectors in the movement source cluster (removes such from the movement source cluster). In the example in FIG. 4, one feature vector in cluster 1 having a distance from the center of cluster 4 that is within a prescribed value is moved to cluster 4.

The reason a feature vector within a prescribed value is moved is that when a feature vector too far is moved to the movement destination cluster, the accuracy of extraction rules created from the movement destination cluster worsens.

By accomplishing this kind of process, data of a different cluster is added to the movement destination cluster, so it is possible to increase the data similarity dispersion. In addition, the data amount is reduced in the movement source cluster, so it is possible to reduce the data amount dispersion.

In the case of the example in FIG. 4, cluster 4, which is the movement destination cluster, has only a feature vector having only the surface character string "OOVoice", so an extraction rule with low generalization capacity that can only extract this word is generated. However, through the cluster update process, a feature vector of cluster 1 having a surface character string other than "OOVoice" is added. Accordingly, it is possible to learn an extraction rule for extracting words other than "OOVoice" from the feature vectors in cluster 4, and it is possible to generate an extraction rule with high generalization capacity.

Feature vectors that are movement or deletion targets may be selected through the following criteria.

For example, when the data similarity dispersion of the movement source cluster is lower than other clusters, feature vectors that are the target of movement or deletion are feature vectors that are closest to the center of the movement source cluster. The reason for this is to control deviation of learning data in the cluster.

In addition, when the data similarity dispersion of the movement source cluster is not lower than other clusters, feature vectors that are the target of movement or deletion may be selected at random, or feature vectors farthest from the center of that cluster may be selected, or feature vectors of the unknown class may be selected with priority. The reason for this is that feature vectors of the unknown class are extremely abundant in the annotated text data (solution data), and when unknown data is too abundant, data imbalance results and accuracy deteriorates.

Returning to FIG. 1, the extraction rule generation unit 104 accomplishes machine learning with the concentration of feature vectors in the cluster as input, for each cluster updated by the cluster update unit 103, and generates an extraction rule for extracting classes. For example, the extraction rule generation unit 104 accomplishes machine learning using an SVM with a feature vector created from the annotation of the class for which the extraction rule was generated as a positive example and a feature vector created from a part other than this as a negative example, for each cluster. Furthermore, the extraction rule generation unit 104 generates rules distinguishing between the positive example and the negative example as extraction rules for this class. Furthermore, the extraction rule generation unit 104 stores the generated extraction rules in the extraction rule memory unit 105, associating these with the feature vectors that were the source of this extraction rule generation and identification information for the cluster.

The input unit 106 inputs into the cluster specification unit 107 the feature vector generated for each appearing word in the text with no annotation that is a target of class extraction.

The cluster specification unit 107 specifies the cluster most similar to the feature vector input from the input unit 106, with reference to the extraction rule memory unit 105.

For example, the cluster specification unit 107 finds the similarity between the feature vector input from the input unit 106 and each feature vector, and specifies as the similar cluster the cluster containing the feature vector most similar to the input feature vector. In addition, for example the cluster specification unit 107 may specify as the similar cluster a cluster containing the largest number of feature vectors whose similarity to the input feature vector is at least a prescribed value.

The extraction rule application unit 108 determines (extracts) the class of the input feature vector using the extraction rule generated from the cluster specified by the cluster specification unit 107.

The output unit 109 outputs to a display device and/or the like the class determined by the extraction rule application unit 108.

Next, the actions of processes executed by the characteristic expression extraction device 100 will be explained.

FIG. 7 is a flowchart showing the flow of processes for the characteristic expression extraction device 100 determining the class of words in unannotated text.

First, the characteristic expression extraction device 100 executes an extraction rule generation process and generates an extraction rule for extracting a class based on the feature vector extracted from the annotated text (solution data) of that class (step S10). Next, the characteristic expression extraction device 100 executes an extraction rule application process and determines the class of that word by applying the extraction rule created for the feature vector extracted from the word in the unannotated text whose class is to be extracted (step S20).

Figure 8:
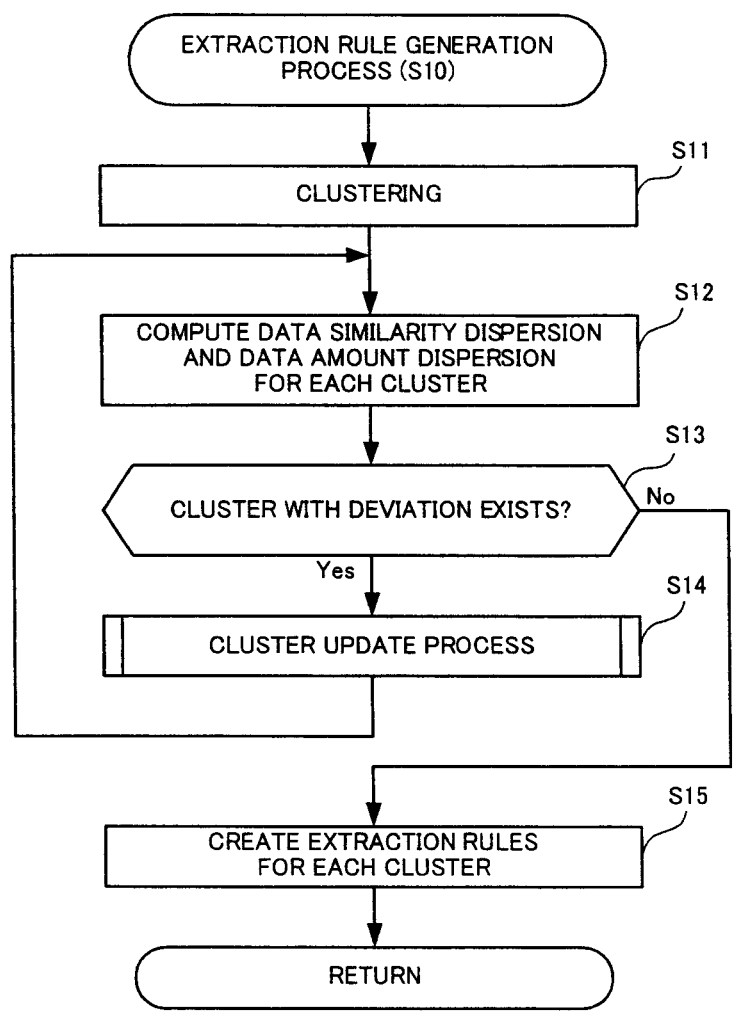
FIG. 8 is a flowchart for explaining the actions of an extraction rule generation process.

Next, details of the extraction rule generation process (step S10) will be explained with reference to the flowchart in FIG. 8. In advance, the characteristic expression extraction device 100 stores the feature vector extracted from the solution data in the annotated feature vector memory unit 101.

Upon receiving instructions to start the process from a user or an external system, the characteristic expression extraction device 100 accomplishes the extraction rule generation process. First, the clustering unit 102 clusters the feature vectors stored in the annotated feature vector memory unit 101 (step S11).

Next, the dispersion computation unit 103a of the cluster update unit 103 computes the data similarity dispersion and data amount dispersion for each cluster (step S12). Furthermore, the determination unit 103b of the cluster update unit 103 determines the absence or presence of clusters with data deviation by comparing this computed value to a threshold value (step S13).

When it is determined that there is a cluster with data deviation (step S13: Yes), the update unit 103c of the cluster update unit 103 accomplishes a cluster update process to update the data deviation by moving or deleting feature vectors in the cluster so as to raise the data similarity dispersion and/or lower the data amount dispersion (step S14).

Figure 9:
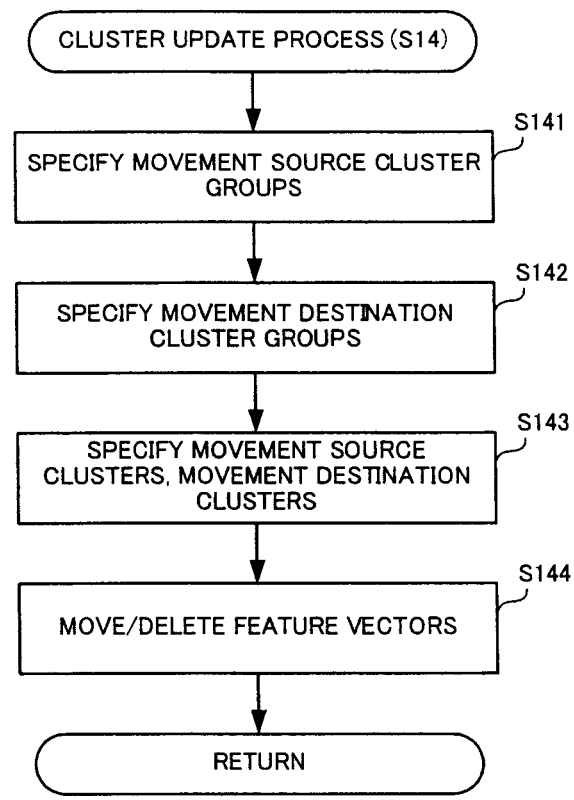
FIG. 9 is a flowchart for explaining the actions of a cluster update process.

Details of this cluster update process (step S14) will be explained with reference to the flowchart in FIG. 9. First, the update unit 103c specifies the movement source cluster group that is a concentration of clusters that are movement source or deletion candidates (step S141). Next, the update unit 103c specifies the movement destination cluster group that is a concentration of clusters that are movement destination candidates (step S142). Furthermore, the update unit 103c specifies the movement source cluster and the movement destination cluster based on the similarity between clusters in the two cluster groups (step S143). Furthermore, the update unit 103c accomplishes movement of a feature vector from the movement source cluster to the movement destination cluster, or deletion of the feature vector from the movement source cluster (step S144). With this, the cluster update process ends. The cluster deviation is improved by this cluster update process.

Returning to FIG. 8, when the cluster update process (step S14) ends, the determination unit 103b of the cluster update unit 103 again finds the data similarity dispersion and the data mount dispersion for each cluster (step S12), and determines the absence or presence of a cluster with deviation (step S13).

When it is determined that there is no cluster with data deviation (step S13: No), the extraction rule generation unit 104 accomplishes machine learning using the feature vectors in the cluster, for each cluster, creates an extraction rule for extracting classes and stores the results in the extraction rule memory means (step S15). With this, the extraction rule generation process ends.

Figure 10:
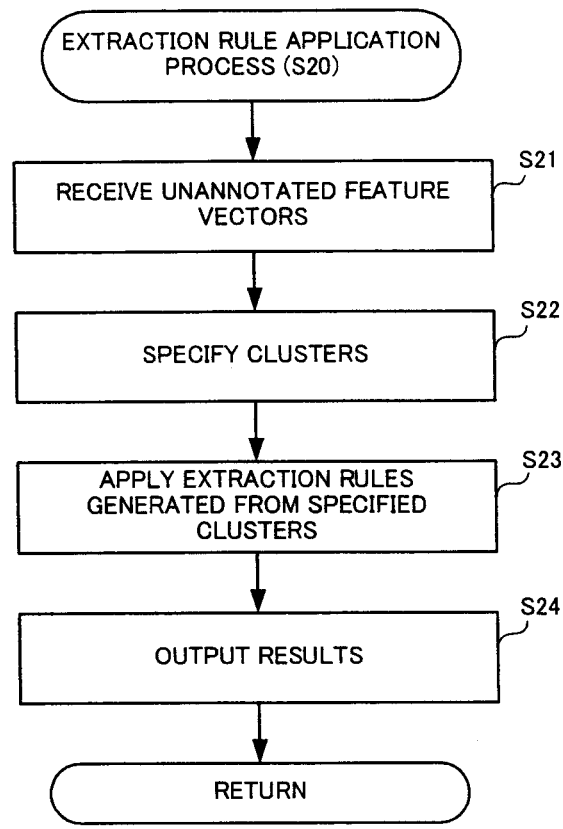
FIG. 10 is a flowchart for explaining the actions of an extraction rule application process.

Next, details of the extraction rule application process (step S20) will be explained with reference to the flowchart in FIG. 10.

When a feature vector created from a word in unannotated text data is received via the input unit 106 (step S21), the cluster specification unit 107 specifies the cluster most similar to the input featured vector with reference to the extraction rule memory unit 105 (step S22). Furthermore, the extraction rule application unit 108 determines the class of the input feature vector using the extraction rule generated from the feature vectors in the specified cluster (step S23), and the output unit 109 outputs these determination results (step S24). With this, the extraction rule application process ends.

In this manner, with the first preferred embodiment, feature vectors in a cluster are moved or deleted so as to reduce data deviation, based on the data similarity dispersion indicating deviation of data in the cluster and the data amount dispersion indicating deviation of data between clusters. Through this, an extraction rule can be created from feature vectors clustered so that there is no data deviation, making it possible to extract the meaning class with good accuracy using that extraction rule.

Second Preferred Embodiment

Next, a characteristic expression extraction device 200 according to a second preferred embodiment of the present invention will be described.

The characteristic expression extraction device 200 according to the second preferred embodiment is the composition of the characteristic expression extraction device 100 according to the first preferred embodiment to which an unannotated feature vector memory unit 201 and a feature vector addition unit 202 have been added. In the below description and drawings, components that are the same as in the first preferred embodiment are labeled with the same symbols. In addition, detailed explanation of constituent elements that are the same as in the first preferred embodiment are omitted from this detailed description, as such conform to the description of the above-described first preferred embodiment.

The unannotated feature vector memory unit 201 stores feature vectors created from appearing words in unannotated text data.

The feature vector addition unit 202 adds to the cluster feature vectors stored in the unannotated feature vector memory unit 201.

The various other parts (the annotated feature vector memory unit 101, the clustering unit 102, the cluster update unit 103, the extraction rule generation unit 104, the extraction rule memory unit 105, the input unit 106, the cluster specification unit 107, the extraction rule application unit 108 and the output unit 109) accomplish the same processes as in the first preferred embodiment, so explanation of such is omitted here. However, the extraction rule generation unit 104 creates extraction data for each cluster in a state updated by the cluster update unit 103 and in which a feature vector has been newly added by the feature vector addition unit 202.

Figure 12:
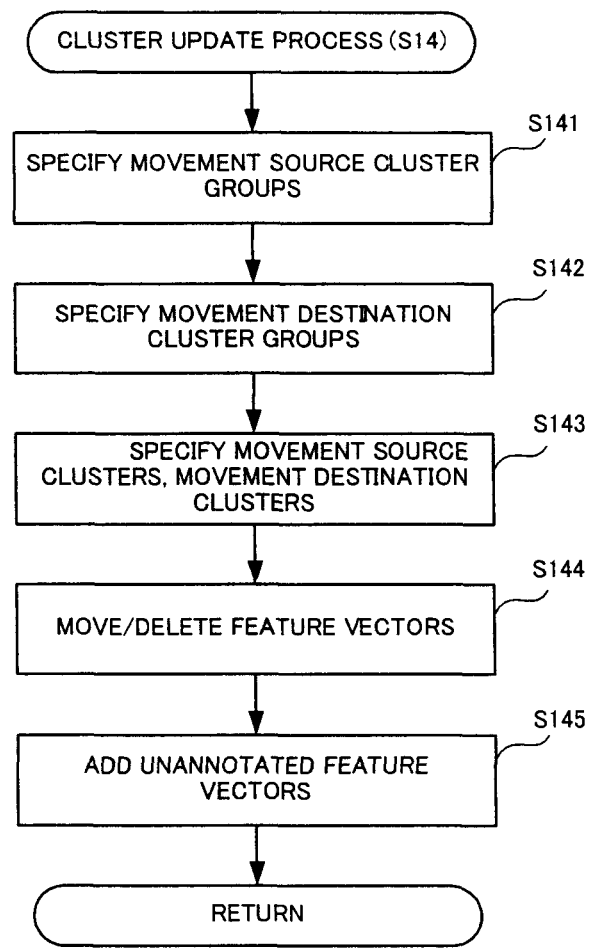
FIG. 12 is a flowchart for explaining the actions of a cluster update process.

Next, the actions of the process executed by the characteristic expression extraction device 200 according to the second preferred embodiment will be described. With the characteristic expression extraction device 200 according to the second preferred embodiment, the processes other than the cluster update process explained with the flowchart in FIG. 9 are basically the same as in the first preferred embodiment. FIG. 12 is a flowchart showing the actions of the cluster update process executed by the characteristic expression extraction device 200 according to the second preferred embodiment.

The cluster update unit 103 specifies the movement source cluster group and the movement destination cluster group the same as in the first preferred embodiment (step S141, step S142), and specifies the movement source cluster and the movement destination cluster from both cluster groups (step S143). Furthermore, the cluster update unit 103 moves the feature vector from the movement source cluster to the movement destination cluster, or deletes the feature vector from the movement source cluster, the same as in the first preferred embodiment (step S144).

Next, the feature vector addition unit 202 adds a feature vector stored in the unannotated feature vector memory unit 201 to a cluster whose data amount is still smaller than the other despite moving or deleting feature vectors (step S145). With this, the cluster update process ends.

Specifically, the feature vector may be added by accomplishing the below processes.

First, the feature vector addition unit 202 specifies a cluster whose data number is less than a prescribed value as a cluster that is a target of addition. At this time, when there are multiple clusters whose data number is less than the prescribed value, clusters with high data dispersion may be specified as clusters that are targets of addition, with priority.

For example, the three clusters with the highest data dispersion, out of the clusters whose data numbers are less than the prescribed value, may be specified as clusters that are targets of addition. When there is no cluster whose data number is less than the prescribed value, the process in step S145 ends.

Next, the feature vector addition unit 202 creates a list of vectors to which a class is appended among feature vectors in the clusters specified as targets of addition (that is to say, those that are not unknown).

Furthermore, the feature vector addition unit 202 extracts a feature vector most similar to each feature vector in the created listed from the unannotated feature vector memory unit 201. Furthermore, the feature vector addition unit 202 adds this to the cluster that is the target of addition after updating the class of the extracted feature vector to the same class as the feature vector in the list.

In this manner, with this preferred embodiment it is possible to increase learning data by adding unannotated feature vectors to clusters with little learning data (feature vectors). Accordingly, it is possible to further reduce deviation in learning data among clusters.

Third Preferred Embodiment

Next, a characteristic expression extraction device 300 according to a third preferred embodiment of the present invention will be described.

Figure 13:
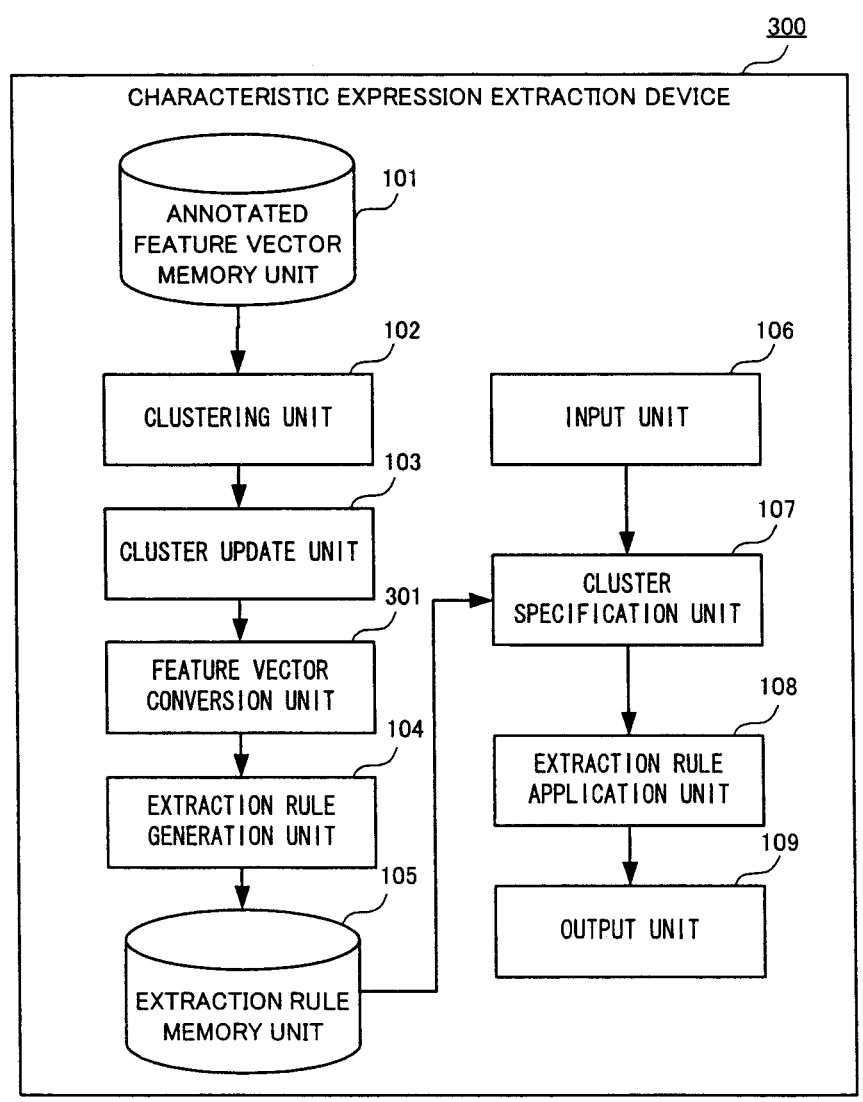
FIG. 13 is a drawing showing the composition of a characteristic expression extraction device according to a third preferred embodiment of the present invention.

The characteristic expression extraction device according to the third preferred embodiment has the composition of the characteristic expression extraction device 100 according to the first preferred embodiment to which has been added a feature vector conversion unit 301, as shown in FIG. 13. In the below description and drawings, components that are the same as in the first preferred embodiment are labeled with the same symbols. In addition, detailed explanation of constituent elements that are the same as in the first preferred embodiment are omitted from this detailed description, as such conform to the description of the above-described first preferred embodiment.

The feature vector conversion unit 301 specifies the features appearing frequently with feature vectors in the cluster, with feature vectors of each cluster as input. Furthermore, the feature vector conversion unit 301 converts (updates) the feature vectors by applying a prescribed weighting to the values of the specified feature. At this time, it is preferable to use a negative weighting (a weighting as the value of the feature becomes smaller).

In addition, the feature vector conversion unit 301 may specify a feature that appears frequently in feature vectors in the cluster but does not appear frequently in other clusters, and apply a weighting to that value.

The various other parts (the annotated feature vector memory unit 101, the clustering unit 102, the cluster update unit 103, the extraction rule generation unit 104, the extraction rule memory unit 105, the input unit 106, the cluster specification unit 107, the extraction rule application unit 108 and the output unit 109) accomplish the same processes as in the first preferred embodiment, so explanation of such is omitted here. However, the extraction rule generation unit 104 creates extraction data for each cluster in a state in which the feature vector is converted by the feature vector conversion unit 301.

Next, the process of converting a feature vector in a cluster will be explained concretely, taking as an example a cluster composed of the four feature vectors shown in FIG. 14A.

In this case, the value (frequency) of each feature of the feature vectors in this cluster are shown in FIG. 15. In this example, suppose that the top two features are features appearing frequently. Accordingly, the feature vector conversion unit 301 specifies that the features "context_particle" and "context_noun" appear frequently in the feature vectors in this cluster. Furthermore, the feature vector conversion unit 301 updates the values of these two features context_particle" and "context_noun" that appear frequently to values with 0.5 weighting. Accordingly, the feature vectors in this cluster are converted (updated) to the feature values shown in FIG. 14B.

In this example, the top two features are features that appear frequently, but this is one example, and it would be fine for the top three features to be considered frequently appearing features, or for the top 10% to be considered frequently occurring features. In addition, the weighting is not limited to 0.5, for arbitrary prescribed values can be set.

Figure 16:
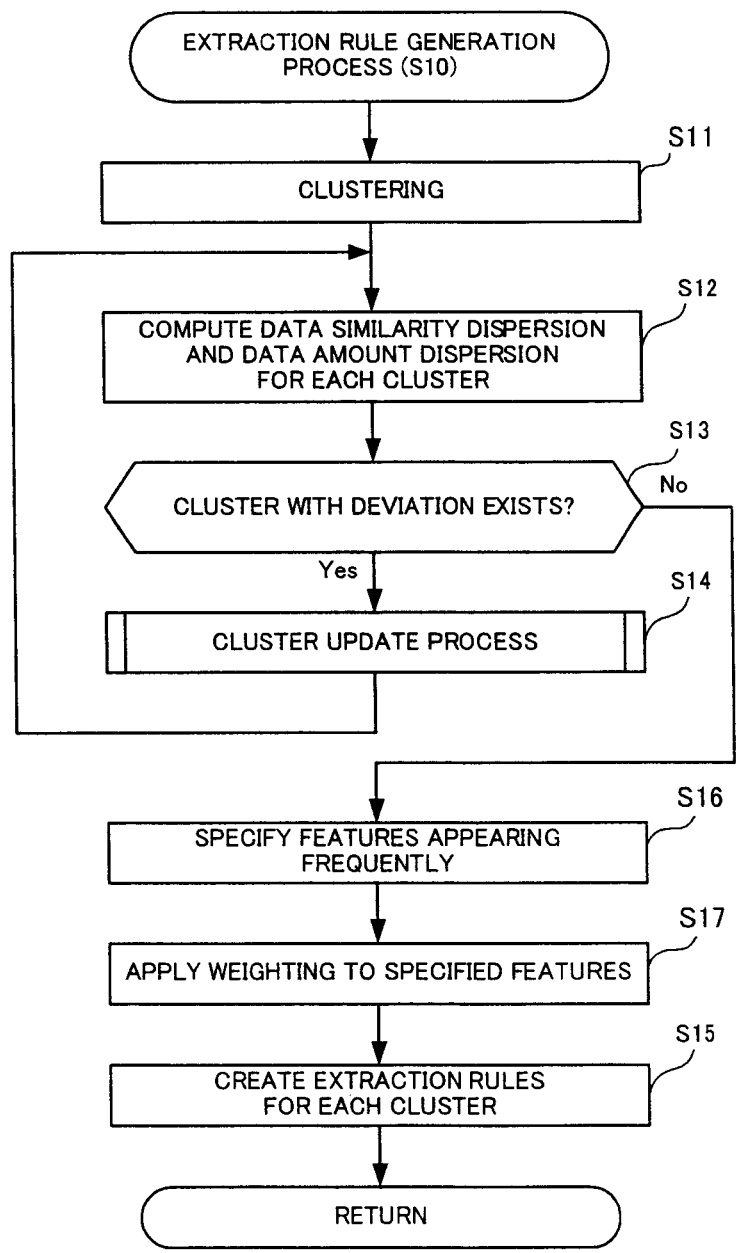
FIG. 16 is a flowchart for explaining the actions of an extraction rule generation process.

Next, the actions of the process executed by the characteristic expression extraction device 300 according to the third preferred embodiment will be described. With the characteristic expression extraction device 300 according to the third preferred embodiment, the processes other than the extraction rule generation process explained in the flowchart in FIG. 8 are basically the same as in the first preferred embodiment. FIG. 16 is a flowchart showing the actions of the extraction rule generation process executed by the characteristic expression extraction device 300 according to the third preferred embodiment.

First, the clustering unit 102 clusters the feature vectors stored in the annotated feature vector memory unit 101, the same as in the first preferred embodiment (step S11). Furthermore, the cluster update unit 103 computes the data similarity dispersion and the data amount dispersion for each cluster, the same as in the first preferred embodiment (step S12), and these computed values are compared with threshold values to determine the absence or presence of clusters having data deviation (step S13). Furthermore, when there is deviation (step S13: Yes), the cluster update unit 103 accomplishes a cluster update process that moves or deletes feature vectors, the same as in the first preferred embodiment (step S14). Furthermore, the data similarity dispersion and data amount dispersion are again computed and the process of determining the absence or presence of clusters having data deviation is repeated (step S12, step S13).

When there is no deviation (step S13: No), the feature vector conversion unit 301 specifies frequently occurring features out of the features of the feature vectors in the cluster, for each clustered cluster (step S16). Furthermore, the feature vector conversion unit 301 converts (updates) the value of the specified feature to a value with a prescribed weighting (step S17). Furthermore, the extraction rule generation unit 104 generates an extraction rule for each cluster in a state with the feature vectors converted (step S15). With this, the extraction rule generation process ends.

In general, features that occur frequently in the feature vectors in the cluster are "context_particle" and "context_noun" and/or the like, and do not characterize that cluster. Accordingly, when an extraction rule is created using the value of the frequently appearing values without change, relative variation in patterns created from other characteristic features becomes smaller, so the accuracy of the extraction rule created worsens. With this preferred embodiment, as explained above those effects are controlled by applying a prescribed weighting to the frequently appearing features. Accordingly, it is possible to create more accurate extraction rules from that cluster.

Various variations and applications of the above-described preferred embodiments are possible.

For example, an example was illustrated with the above-described preferred embodiments in which a characteristic expression class is extracted, but the present invention is not limited to a characteristic expression, and it is possible to apply this to meaning extraction for an annotated word for identifying an arbitrary meaning (class).

Figure 17:
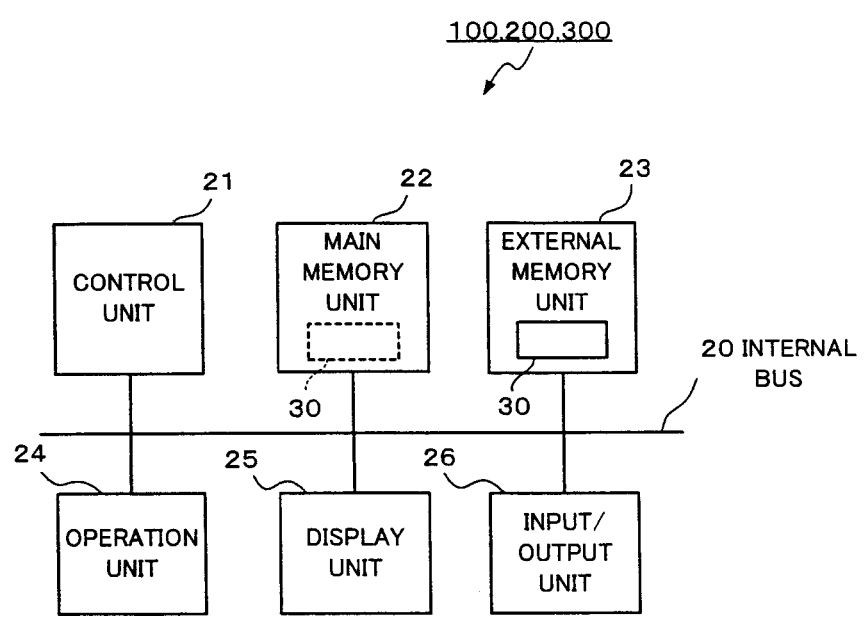
FIG. 17 is a block diagram showing one example of the physical composition when the characteristic expression extraction device of these preferred embodiments is implemented in a computer.

FIG. 17 is a block diagram showing an example of the physical composition when the characteristic expression extraction devices 100, 200 and 300 according to the preferred embodiments of the present invention are implemented in a computer. The characteristic expression extraction devices 100, 200 and 300 according to the preferred embodiments of the present invention can be realized through a hardware composition similar to a typical computer system. The characteristic expression extraction devices 100, 200 and 300 are provided with a control unit 21, a main memory unit 22, an external memory unit 23, an operation unit 24, a display unit 25 and an input/output unit 26. The main memory unit 22, the external memory unit 23, the operation unit 24, the display unit 25 and the input/output unit 26 are all connected to the control unit 21 via an internal bus 20.

The control unit 21 is composed of a CPU (Central Processing Unit) and/or the like, and executes a dictionary creation process in each of the above-described preferred embodiments in accordance with a control program 30 stored in the external memory unit 23.

The main memory unit 22 is composed of RAM (Random Access Memory), loads the control program 30 stored in the external memory unit 23 and is used as a work area for the control unit 21.

The external memory unit 23 is composed of non-volatile memory such as flash memory, a hard disk, a DVD-RAM (Digital Versatile Disc Random Access Memory), a DVD-RW (Digital Versatile Disc ReWritable) and/or the like and stores in advance the control program 30 to cause the control unit 21 to execute the above-described processes, and data such as threshold values. In addition, the external memory unit 23 supplies data stored by this control program 30 to the control unit 21 and stores data supplied from the control unit 21, in accordance with commands from the control unit 21. In addition, the external memory unit 23 physically realizes the annotated feature vector memory unit 101, the extraction rule memory unit 105 and the unannotated feature vector memory unit 201 in the above-described preferred embodiments.

The operation unit 24 is composed of a keyboard and a pointing device such as a mouse and/or the like, and an interface device connecting the keyboard and pointing device and/or the like to the internal bus 20. Via the operation unit 24, feature vectors created from unannotated text whose meaning is to be extracted and commands to start various processes are supplied to the control unit 21.

The display unit 25 is composed of a CRT (Cathode Ray Tube) or an LCD (Liquid Crystal Display) and/or the like, and displays various types of information. For example, the display unit 25 displays the extracted class along with the word name that was the source of creating the input feature vector.

The input/output unit 26 is composed of a wireless transceiver, a wireless modem or a network terminal device, and a serial interface or LAN (Local Area Network) interface connected thereto. For example, feature vectors extracted from annotated text may be collected via the input/output unit 26.

Figure 11:
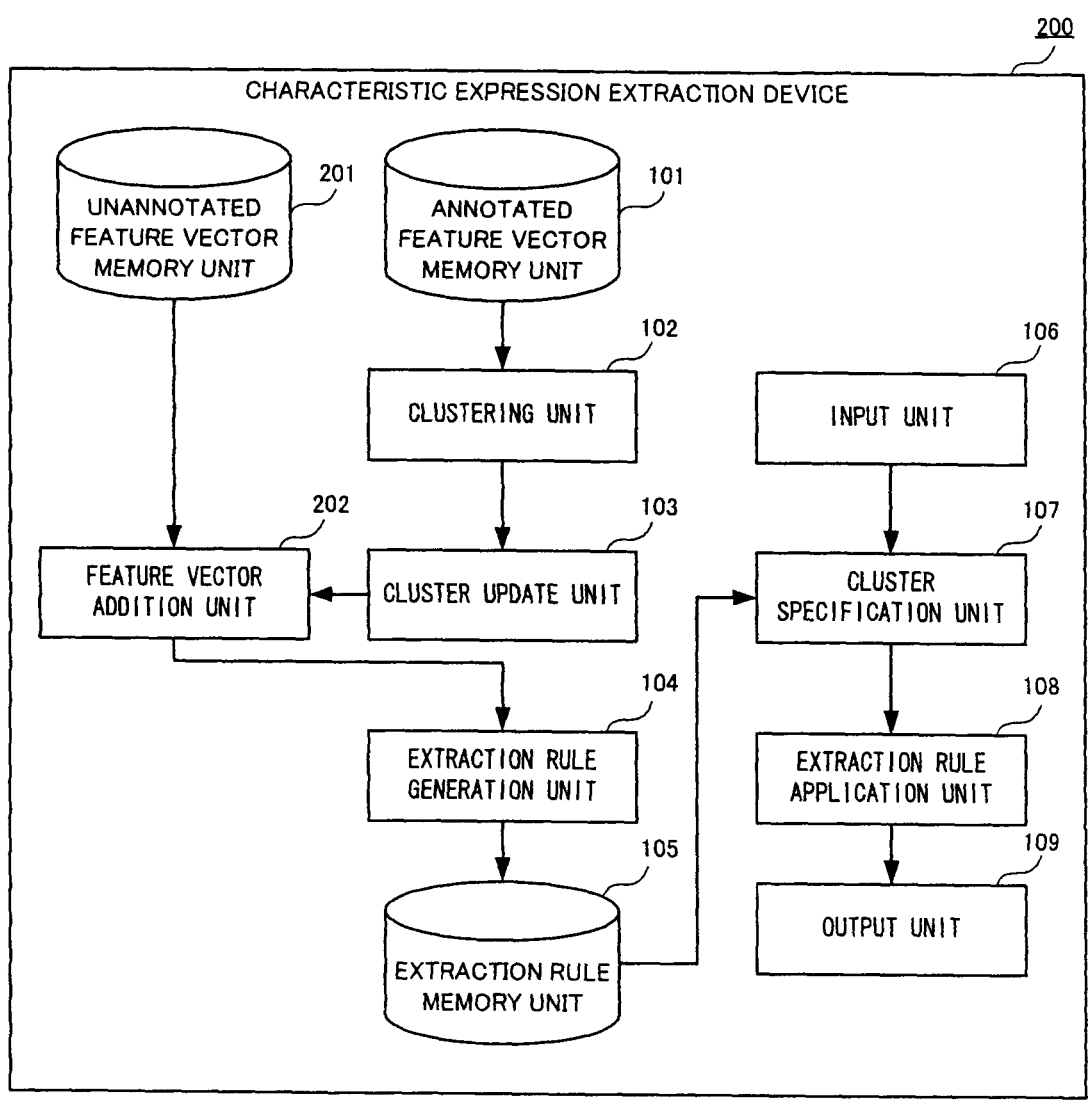
FIG. 11 is a drawing showing the composition of a characteristic expression extraction device according to a second preferred embodiment of the present invention.

The processes executed by the clustering unit 102, the cluster update unit 103, the extraction rule generation unit 104, the input unit 106, the cluster specification unit 107, the extraction rule application unit 108, the output unit 109, the feature vector addition unit 202 and the feature vector update unit 301 of the characteristic expression extraction devices 100, 200 and 300 shown in FIGS. 1, 11 and 13 are executed by the control program 30 processing, using as resources the control unit 21, the main memory unit 22, the external memory unit 23, the operation unit 24, the display unit 25 and the input/output unit 26.

The above-described hardware composition and flowcharts are but one example, and can be arbitrarily changed or altered.

In addition, the portion that is central to accomplishing the processes of the characteristic expression extraction devices 100, 200 and 300 composed of the control unit 21, the main memory unit 22, the main memory unit 23, the operation unit 24, the input/output unit 26, the internal bus 20 and/or the like can be realized without a specialized system by using a normal computer system. For example, it would be fine for a computer program for executing the above-described actions to be stored on and distributed by a computer-readable recording medium (flexible disk, CD-ROM, DVD-ROM and/or the like) and for the characteristic expression extraction devices 100, 200 and 300 to be composed by installing this computer program on a computer. In addition, this computer program may be stored in a memory device possessed by a server device on a communications network such as the Internet and/or the like, and the characteristic expression extraction devices 100, 200 and 300 may be composed by downloading this onto a normal computer system.

In addition, the functions of the characteristic expression extraction devices 100, 200 and 300 may be divided between an OS (operating system) and application programs, and in addition, when these are realized through cooperation between an OS and application programs, the application program portion alone may be stored on a recording medium or the memory device.

In addition, the computer program can be superimposed on carrier waves and distributed via a communication network. For example, the above-described computer program may be posted on a BBS (Bulletin Board System) on a communication network and the above-described computer program may be distributed via the network. Furthermore, the composition may be such that the above-described processes can be executed by launching this computer program and similarly executing other application programs under the control of the OS.

The above-described hardware composition and flowcharts are but one example, and can be arbitrarily changed or altered.

All or parts of the above-described preferred embodiments are noted in the below appendices but are not limited to the below.

APPENDIX 1

A meaning extraction device, comprising:
a clustering means for acquiring feature vectors generated for each word appearing in solution data in which annotations are appended to words having specific meanings to identify that meaning, and having as factors feature values indicating the features of those words and surrounding words, and clustering the acquired feature vectors into multiple clusters based on the similarity between feature vectors;
a cluster updating means for determining whether or not each of the feature vectors clustered by the clustering means has a deviation in the clusters, and when it is determined that there is a cluster having a deviation, updating the feature vectors clustered in each cluster so as to improve the deviation;
an extraction rule generating means for accomplishing machine learning based on the feature vectors in a cluster for each cluster and generating extraction rules for extracting words having a specific meaning; and
an extraction rule application means for receiving a feature vector created from words in a document that is a target of meaning extracting, specifying the optimum extraction rule for this feature vector and extracting the meaning of words that were the source of creating the feature vector by applying the specified extraction rule to the feature vector.

APPENDIX 2

The meaning extraction device of Appendix 1, wherein the cluster updating means comprises:
a dispersion computation means for computing at least one out of an intra-cluster dispersion indicating the degree of scattering of feature vectors in each cluster, or an inter-cluster dispersion indicating the degree of scattering of the feature vectors to each cluster;
a determination means for determining whether or not there is a cluster with a deviation by comparing one or both of the intra-cluster dispersion and the inter-cluster dispersion computed by the dispersion computation means with a threshold value; and
an update means for accomplishing a process that moves a feature vector in a cluster or deletes such so as to raise the intra-cluster dispersion and lower the inter-cluster dispersion of a cluster for which it was determined that there is a deviation, when it is determined that there is a cluster having a deviation.

APPENDIX 3

The meaning extraction device of Appendix 1 or 2, wherein the cluster update means comprises:
  a dispersion computation means for computing an intra-cluster dispersion indicating the degree of scattering of feature vectors in each cluster;
  a determination means for determining whether there is a cluster having a deviation, when there is a cluster not indicating a state with the computed intra-cluster dispersions scattered more than a constant; and
  an update means for updating each cluster so that the intra-cluster dispersion of a cluster determined to have the deviation indicates a state scattered more than a constant, when it is determined that there is a cluster having the deviation.

APPENDIX 4

The meaning extraction device of Appendix 2 or 3, wherein the dispersion computation means computes the intra-cluster dispersion based on the dissimilarity between a feature vector in each cluster and a feature vector at the center of each cluster.

APPENDIX 5

The meaning extraction device of any of Appendices 1 through 4, wherein the cluster update means comprises:
  a dispersion computation means for computing an inter-cluster dispersion indicating the degree of scattering of feature vectors to each cluster;
  a determination means for determining whether there is a cluster having a deviation, when there is a cluster not indicating a state with the computed inter-cluster dispersions scattered more than a constant; and
  an update means for updating each cluster so that the inter-cluster dispersion of a cluster determined to have the deviation indicates a state scattered more than a constant, when it is determined that there is a cluster having the deviation.

APPENDIX 6

The meaning extraction device according to any of Appendices 2 through 5, wherein the dispersion computation means computes the inter-cluster dispersion based on the difference between the number of feature vectors in each cluster and the average value over all clusters of the number of feature vectors in each cluster.

APPENDIX 7

The meaning extraction device according to Appendix 5 or 6, wherein:
  the determination means determines that there is a cluster with the deviation when there is a cluster not indicating a state in which the inter-cluster dispersion is scattered more than a constant because the feature vectors are concentrated more than a constant; and
  when it is determined that there is a cluster with the deviation, the update means updates each of the clusters by deleting feature vectors of the cluster whose feature vectors are concentrated more than a constant, or moves said feature vectors to another cluster.

APPENDIX 8

The meaning extraction device according to any of Appendices 5 through 7, wherein:
  the determination means there is a cluster with the deviation when there is a cluster not indicating a state in which the inter-cluster dispersion is scattered more than a constant because the feature vectors are lacking more than a constant; and
  when it is determined that there is a cluster with the deviation, the update means updates each of the clusters by adding feature vectors from other clusters to the cluster whose feature vectors are lacking more than a constant.

APPENDIX 9

The meaning extraction device according to any of Appendices 5 through 8, wherein:
  the dispersion computation means further computes an intra-cluster dispersion indicating the degree of scattering of feature vectors in each cluster;
  the determination means determines that there is a cluster with the deviation when there is a cluster not indicating a state with the computed intra-cluster dispersion scattered more than a constant; and
  when it is determined that there is a cluster with the deviation, the update means updates each cluster so that the intra-cluster dispersion and the inter-cluster dispersion of the cluster determined to have a deviation indicate states scattered more than the constant.

APPENDIX 10

The meaning extraction device according to Appendix 9, wherein:
  when it is determined that there is a cluster with the deviation, the update means updates each cluster by deleting feature vectors near the center of the cluster or moving those feature vectors to another cluster, when there is a cluster not indicating a state with the inter-cluster dispersion scattered more than a constant because the feature vectors are concentrated more than a constant, and not indicating a state with the intra-cluster dispersion scattered more than a constant.

APPENDIX 11

The meaning extraction device according to Appendix 9 or 10, wherein:
  when it is determined that there is a cluster with the deviation, the update means updates each cluster by adding feature vectors of other clusters closest to the center of that cluster and at least a prescribed distance from all feature vectors in that cluster, when there is a cluster not indicating a state with the inter-cluster dispersion scattered more than a constant because the feature vectors are lacking more than a constant, and not indicating a state with the intra-cluster dispersion scattered more than a constant.

APPENDIX 12

The meaning extraction device according to any of Appendices 1 through 11, further comprising:

an unannotated feature vector memory means for storing feature vectors created from words in unannotated documents; and a feature vector addition means for acquiring, even after a process by the cluster update means, a feature vector corresponding to a cluster whose number of feature vectors in the cluster is less than a prescribed value from the unannotated feature vector memory means, and adding such to that cluster as an annotated feature vector corresponding to that cluster.

APPENDIX 13

The meaning extraction device according to any of Appendices 1 through 12, further comprising:
a feature vector conversion means for specifying a feature value appearing frequently in the feature vectors in a cluster and updating the specified feature value to a value with a prescribed weighting.

APPENDIX 14

A meaning extraction method characterized in:
acquiring feature vectors generated for each word appearing in solution data in which annotations are appended to words having specific meanings to identify that meaning, and having as factors feature values indicating the features of those words and surrounding words, and clustering the acquired feature vectors into multiple clusters based on the similarity between feature vectors;
determining whether or not each of the clustered feature vectors has a deviation in the clusters, and when it is determined that there is a cluster having a deviation, updating the feature vectors clustered in each cluster so as to improve the deviation;
accomplishing machine learning based on the feature vectors in a cluster for each cluster and generating extraction rules for extracting words having a specific meaning; and
receiving a feature vector created from words in a document that is a target of meaning extracting, specifying the optimum extraction rule for this feature vector and extracting the meaning of words that were the source of creating the feature vector by applying the specified extraction rule to the feature vector.

APPENDIX 15

A computer-readable recording medium on which is recorded a program that causes a computer to function as:
a clustering means for acquiring feature vectors generated for each word appearing in solution data in which annotations are appended to words having specific meanings to identify that meaning, and having as factors feature values indicating the features of those words and surrounding words, and clustering the acquired feature vectors into multiple clusters based on the similarity between feature vectors;
a cluster updating means for determining whether or not each of the feature vectors clustered by the clustering means has a deviation in the clusters, and when it is determined that there is a cluster having a deviation, updates the feature vectors clustered in each cluster so as to improve the deviation;
an extraction rule generating means for accomplishing machine learning based on the feature vectors in a cluster for each cluster and generating extraction rules for extracting words having a specific meaning; and
an extraction rule application means for receiving a feature vector created from words in a document that is a target of meaning extracting, specifying the optimum extraction rule for this feature vector and extracting the meaning of words that were the source of creating the feature vector by applying the specified extraction rule to the feature vector.

This application claims the benefit of Japanese Patent Application 2010-071857, filed 26 Mar. 2010, the entire disclosure of which is incorporated by reference herein

DESCRIPTION OF REFERENCE NUMERALS

100 Characteristic expression extraction device
101 Annotated feature vector memory unit
102 Clustering unit
103 Cluster update unit
103a Dispersion computation unit
103b Determination unit
103c Update unit
104 Extraction rule generation unit
105 Extraction rule memory unit
106 Input unit
107 Cluster specification unit
108 Extraction rule application unit
109 Output unit

The invention claimed is:

1. A meaning extraction device, comprising:
a clustering means for acquiring feature vectors generated for each word appearing in solution data in which annotations are appended to words having specific meanings to identify the respective specific meaning, and having as factors feature values indicating the features of the appearing words and surrounding words, and clustering the acquired feature vectors into multiple clusters based on the similarity between feature vectors;
a cluster updating means for determining whether or not each of the feature vectors clustered by the clustering means has a deviation in the clusters, and when it is determined that there is a cluster having a deviation, updating the feature vectors clustered in each cluster so as to improve the deviation;
an extraction rule generating means for accomplishing machine learning based on the feature vectors in a cluster for each cluster and, based on results of the accomplished machine learning, generating for each of the clusters extraction rules for extracting words having the respective specific meaning; and
an extraction rule application means for receiving a feature vector created from words in a document that is a target of meaning extracting, specifying the optimum extraction rule for this feature vector and extracting the meaning of words, in the document that is the target of meaning extraction, that were the source of creating the feature vector by applying the specified optimum extraction rule to the feature vector.

2. The meaning extraction device of claim 1, wherein the cluster updating means comprises:
a dispersion computation means for computing at least one out of an intra-cluster dispersion indicating the degree of scattering of feature vectors in each cluster, or an inter-cluster dispersion indicating the degree of scattering of the feature vectors to each cluster;
a determination means for determining whether or not there is a cluster with a deviation by comparing one or both of the intra-cluster dispersion and the inter-cluster dispersion computed by the dispersion computation means with a threshold value; and an update means for accomplishing a process that moves a feature vector in a cluster or deletes such so as to raise the intra-cluster dispersion and lower the inter-cluster dispersion of a cluster for which it was determined that there is a deviation, when it is determined that there is a cluster having a deviation.

3. The meaning extraction device of claim 1, wherein the cluster update means comprises:

a dispersion computation means for computing an intra-cluster dispersion indicating the degree of scattering of feature vectors in each cluster;

a determination means for determining whether there is a cluster having a deviation, when there is a cluster not indicating a state with the computed intra-cluster dispersions scattered more than a constant; and an update means for updating each cluster so that the intra-cluster dispersion of a cluster determined to have the deviation indicates a state scattered more than a constant, when it is determined that there is a cluster having the deviation.

4. The meaning extraction device of claim 2, wherein the dispersion computation means computes the intra-cluster dispersion based on the dissimilarity between a feature vector in each cluster and a feature vector at the center of each cluster.

5. The meaning extraction device of claim 1, wherein the cluster update means comprises:

a dispersion computation means for computing an inter-cluster dispersion indicating the degree of scattering of feature vectors to each cluster;

a determination means for determining whether there is a cluster having a deviation, when there is a cluster not indicating a state with the computed inter-cluster dispersions scattered more than a constant; and an update means for updating each cluster so that the inter-cluster dispersion of a cluster determined to have the deviation indicates a state scattered more than a constant, when it is determined that there is a cluster having the deviation.

6. The meaning extraction device according to claim 2, wherein the dispersion computation means computes the inter-cluster dispersion based on the difference between the number of feature vectors in each cluster and the average value over all clusters of the number of feature vectors in each cluster.

7. The meaning extraction device according to claim 1, further comprising:

an unannotated feature vector memory means for storing feature vectors created from words in unannotated documents; and a feature vector addition means for acquiring, even after a process by the cluster update means, a feature vector corresponding to a cluster whose number of feature vectors in the cluster is less than a prescribed value from the unannotated feature vector memory means, and adding such to that cluster as an annotated feature vector corresponding to that cluster.

8. The meaning extraction device according to claim 1, further comprising:

a feature vector conversion means for specifying a feature value appearing frequently in the feature vectors in a cluster and updating the specified feature value to a value with a prescribed weighting.

9. A meaning extraction method characterized in:

acquiring feature vectors generated for each word appearing in solution data in which annotations are appended to words having specific meanings to identify the respective specific meaning, and having as factors feature values indicating the features of the appearing words and surrounding words, and clustering the acquired feature vectors into multiple clusters based on the similarity between feature vectors;

determining whether or not each of the clustered feature vectors has a deviation in the clusters, and when it is determined that there is a cluster having a deviation, updating the feature vectors clustered in each cluster so as to improve the deviation;

accomplishing machine learning based on the feature vectors in a cluster for each cluster and, based on results of the accomplished machine learning, generating for each of the clusters extraction rules for extracting words having the respective specific meaning; and receiving a feature vector created from words in a document that is a target of meaning extracting, specifying the optimum extraction rule for this feature vector and extracting the meaning of words, in the document that is the target of meaning extraction, that were the source of creating the feature vector by applying the specified optimum extraction rule to the feature vector.

10. A computer-readable and non-transitory recording medium on which is recorded a program that causes a computer to function as:

a clustering means for acquiring feature vectors generated for each word appearing in solution data in which annotations are appended to words having specific meanings to identify the respective specific meaning, and having as factors feature values indicating the features of the appearing words and surrounding words, and clustering the acquired feature vectors into multiple clusters based on the similarity between feature vectors;

a cluster updating means for determining whether or not each of the feature vectors clustered by the clustering means has a deviation in the clusters, and when it is determined that there is a cluster having a deviation, updates the feature vectors clustered in each cluster so as to improve the deviation;

an extraction rule generating means for accomplishing machine learning based on the feature vectors in a cluster for each cluster and, based on results of the accomplished machine learning, generating for each of the clusters extraction rules for extracting words having the respective specific meaning; and an extraction rule application means for receiving a feature vector created from words in a document that is a target of meaning extracting, specifying the optimum extraction rule for this feature vector and extracting the meaning of words, in the document that is the target of meaning extraction, that were the source of creating the feature vector by applying the specified optimum extraction rule to the feature vector.

11. The meaning extraction device of claim 2, wherein the cluster update means comprises:

a dispersion computation means for computing an intra-cluster dispersion indicating the degree of scattering of feature vectors in each cluster;

a determination means for determining whether there is a cluster having a deviation, when there is a cluster not indicating a state with the computed intra-cluster dispersions scattered more than a constant; and an update means for updating each cluster so that the intra-cluster dispersion of a cluster determined to have the deviation indicates a state scattered more than a constant, when it is determined that there is a cluster having the deviation.

12. The meaning extraction device of claim 3, wherein the dispersion computation means computes the intra-cluster dispersion based on the dissimilarity between a feature vector in each cluster and a feature vector at the center of each cluster.

13. The meaning extraction device of claim 2, wherein the cluster update means comprises:
   a dispersion computation means for computing an inter-cluster dispersion indicating the degree of scattering of feature vectors to each cluster;
   a determination means for determining whether there is a cluster having a deviation, when there is a cluster not indicating a state with the computed inter-cluster dispersions scattered more than a constant; and
   an update means for updating each cluster so that the inter-cluster dispersion of a cluster determined to have the deviation indicates a state scattered more than a constant, when it is determined that there is a cluster having the deviation.

14. The meaning extraction device of claim 3, wherein the cluster update means comprises:
   a dispersion computation means for computing an inter-cluster dispersion indicating the degree of scattering of feature vectors to each cluster;
   a determination means for determining whether there is a cluster having a deviation, when there is a cluster not indicating a state with the computed inter-cluster dispersions scattered more than a constant; and
   an update means for updating each cluster so that the inter-cluster dispersion of a cluster determined to have the deviation indicates a state scattered more than a constant, when it is determined that there is a cluster having the deviation.

15. The meaning extraction device of claim 4, wherein the cluster update means comprises:
   a dispersion computation means for computing an inter-cluster dispersion indicating the degree of scattering of feature vectors to each cluster;
   a determination means for determining whether there is a cluster having a deviation, when there is a cluster not indicating a state with the computed inter-cluster dispersions scattered more than a constant; and
   an update means for updating each cluster so that the inter-cluster dispersion of a cluster determined to have the deviation indicates a state scattered more than a constant, when it is determined that there is a cluster having the deviation.

16. The meaning extraction device according to claim 3, wherein the dispersion computation means computes the inter-cluster dispersion based on the difference between the number of feature vectors in each cluster and the average value over all clusters of the number of feature vectors in each cluster.

17. The meaning extraction device according to claim 4, wherein the dispersion computation means computes the inter-cluster dispersion based on the difference between the number of feature vectors in each cluster and the average value over all clusters of the number of feature vectors in each cluster.

18. The meaning extraction device according to claim 5, wherein the dispersion computation means computes the inter-cluster dispersion based on the difference between the number of feature vectors in each cluster and the average value over all clusters of the number of feature vectors in each cluster.

19. The meaning extraction device according to claim 2, further comprising:
   an unannotated feature vector memory means for storing feature vectors created from words in unannotated documents; and
   a feature vector addition means for acquiring, even after a process by the cluster update means, a feature vector corresponding to a cluster whose number of feature vectors in the cluster is less than a prescribed value from the unannotated feature vector memory means, and adding such to that cluster as an annotated feature vector corresponding to that cluster.

20. The meaning extraction device according to claim 3, further comprising:
   an unannotated feature vector memory means for storing feature vectors created from words in unannotated documents; and
   a feature vector addition means for acquiring, even after a process by the cluster update means, a feature vector corresponding to a cluster whose number of feature vectors in the cluster is less than a prescribed value from the unannotated feature vector memory means, and adding such to that cluster as an annotated feature vector corresponding to that cluster.

* * * * *